(12) United States Patent
Akaike et al.

(10) Patent No.: US 10,434,908 B2
(45) Date of Patent: Oct. 8, 2019

(54) AIR CONDITIONING SEAT

(71) Applicant: TOYOTA BOSHOKU KABUSHIKI KAISHA, Aichi-ken (JP)

(72) Inventors: Fumitoshi Akaike, Aichi-ken (JP); Hiroshi Tsuji, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 15/822,584

(22) Filed: Nov. 27, 2017

(65) Prior Publication Data

US 2018/0162243 A1 Jun. 14, 2018

(30) Foreign Application Priority Data

Dec. 12, 2016 (JP) ................................. 2016-239965

(51) Int. Cl.

| B60N 2/56 | (2006.01) |
| B60N 2/90 | (2018.01) |
| B60N 2/62 | (2006.01) |
| B60N 3/06 | (2006.01) |
| B60N 2/75 | (2018.01) |

(Continued)

(52) U.S. Cl.
CPC .............. *B60N 2/5621* (2013.01); *A47C 1/12* (2013.01); *A47C 7/5062* (2018.08); *A47C 7/5066* (2018.08); *A47C 7/744* (2013.01); *B60N 2/56* (2013.01); *B60N 2/62* (2013.01); *B60N 2/75* (2018.02); *B60N 2/995* (2018.02); *B60N 3/06* (2013.01); *B61D 27/0018* (2013.01); *B61D 33/005* (2013.01); *B63B 29/04* (2013.01); *B63B 2029/043* (2013.01); *B64D 11/0626* (2014.12); *B64D 11/0643* (2014.12)

(58) Field of Classification Search
CPC ...... B60N 2/5621; B60N 2/5628; B60N 2/75; B60N 2/995; B60N 2/56; B64D 11/0626
USPC .......................... 297/180.1, 180.13, 180.14
See application file for complete search history.

(56) References Cited

U.S. PATENT DOCUMENTS 3,131,967 A * 5/1964 Spaulding .............. A45D 44/02
297/180.14
5,160,517 A * 11/1992 Hicks ....................... A61G 5/10
297/180.14

(Continued)

FOREIGN PATENT DOCUMENTS

| JP | 2005-253705 | 9/2005 |
| JP | 2013-119344 | 6/2013 |

*Primary Examiner* — Gary C Hoge
(74) *Attorney, Agent, or Firm* — Greenblum & Bernstein, P.L.C.

(57) ABSTRACT

An air conditioning seat configured to blow temperature-adjusted air and including: a seat including a seat cushion and a seat back; a lateral member which is provided along the seated person seated on the seat on a lateral side of the seated person; a first air duct which is provided in the lateral member and is configured to guide the temperature-adjusted air towards the seated person; and a first air outlet from which the temperature-adjusted air is configured to be blown out from first the air duct, wherein the temperature-adjusted air is configured to be directed and blown out towards at least one of a knee and a lower leg portion of a leg of the seated person through the first air outlet, the at least one of the knee and the lower leg portion being positioned on a front side than a front end of the seat cushion.

5 Claims, 6 Drawing Sheets

(51) Int. Cl.

| | |
|---|---|
| *A47C 1/12* | (2006.01) |
| *A47C 7/74* | (2006.01) |
| *A47C 7/50* | (2006.01) |
| *B63B 29/04* | (2006.01) |
| *B61D 27/00* | (2006.01) |
| *B61D 33/00* | (2006.01) |
| *B64D 11/06* | (2006.01) |

(56) References Cited

U.S. PATENT DOCUMENTS

| | | | | |
|---|---|---|---|---|
| 6,079,781 | A * | 6/2000 | Tilley | B60H 1/00285 297/180.1 |
| 2008/0012398 | A1 * | 1/2008 | Alacqua | B60N 2/5628 297/180.1 |
| 2014/0265479 | A1 * | 9/2014 | Bennett | B60N 2/919 297/217.4 |
| 2015/0069811 | A1 * | 3/2015 | Sachs | B60N 2/5657 297/423.1 |
| 2016/0009206 | A1 * | 1/2016 | Perraut | B60N 2/5635 297/180.12 |
| 2016/0250905 | A1 * | 9/2016 | Tanaka | B60H 1/00285 454/75 |
| 2016/0272038 | A1 * | 9/2016 | Tanaka | B60H 1/00285 |
| 2016/0347219 | A1 * | 12/2016 | Akaike | B60N 2/5628 |
| 2018/0117987 | A1 * | 5/2018 | Yamaoka | A47C 7/74 |

* cited by examiner

AIR CONDITIONING SEAT

CROSS-REFERENCE TO RELATED APPLICATIONS

This application claims priority from Japanese Patent Application No. 2016-239965 filed on Dec. 12, 2016, the entire contents of which are incorporated herein by reference.

TECHNICAL FIELD

The disclosure relates to an air conditioning seat which is applied to a vehicle seat of an automobile, an aircraft, a ship, a train, and the like, or applied to an easy chair, a movie theater seat, and the like.

BACKGROUND

There is disclosed in JP-A-2013-119344 and JP-A-2005-253705 an invention in which air is blown towards a seated person seated on a seat such as a vehicle seat. Here, among the body of the seated person, positions where the blown air is received are a neck, a torso, legs, and the like. In JP-A-2013-119344, air is blown from an upper end portion of a seat back to the neck and is blown from a front end portion of an armrest to the torso. Additionally, in JP-A-2005-253705, air is blown from an upper surface of an ottoman to the legs.

In a case of warming a body of a person, cool head and warm feet is common sense, and overall warming of legs will improve comfort. However, in inventions of JP-A-2013-119344 and JP-A-2005-253705, the legs cannot be overall warmed. Although main objects of the inventions of JP-A-2013-119344 and JP-A-2005-253705 are to cool the body by blowing cold air to the seated person, provisionally, even if warm air is blown instead of the cold air, only a part of the legs which contacts the ottoman is warmed in JP-A-2005-253705, so that the legs cannot be overall warmed.

SUMMARY

An object of the disclosure is to perform heating or cooling in an air conditioning seat by blowing air in a way of wrapping a leg of a seated person. In this way, comfort of the seated person is improved by overall warming or cooling of the leg of the seated person.

According to an aspect of the disclosure, there is provided an air conditioning seat configured to blow temperature-adjusted air whose temperature is adjusted by an air conditioning apparatus towards a seated person, the air conditioning seat including: a seat including: a seat cushion serving as a seating portion; and a seat back serving as a backrest; a lateral member which is provided along the seated person seated on the seat on a lateral side of the seated person; a first air duct which is provided in the lateral member and is configured to guide the temperature-adjusted air towards the seated person; and a first air outlet from which the temperature-adjusted air is configured to be blown out from first the air duct, wherein the temperature-adjusted air is configured to be directed and blown out towards at least one of a knee and a lower leg portion of a leg of the seated person through the first air outlet, the at least one of the knee and the lower leg portion being positioned on a front side than a front end of the seat cushion.

In the above aspect, the lateral member can be configured by an armrest which supports an arm of the seated person, a vertical wall member which covers a lateral side of the seated person on a lower side of the armrest, a shield which is a decorative cover for covering a lateral portion of the seat cushion, and the like.

According to the above aspect, since the temperature-adjusted air is directed and blown from the lateral member towards the at least one of the knee and the lower leg portion of the leg of the seated person which are positioned on the front side than the front end of the seat cushion, the temperature-adjusted air can be blown in a way of wrapping the leg of the seated person. As a result, comfort of the leg of the seated person can be improved.

DETAILED DESCRIPTION

Figure 1:
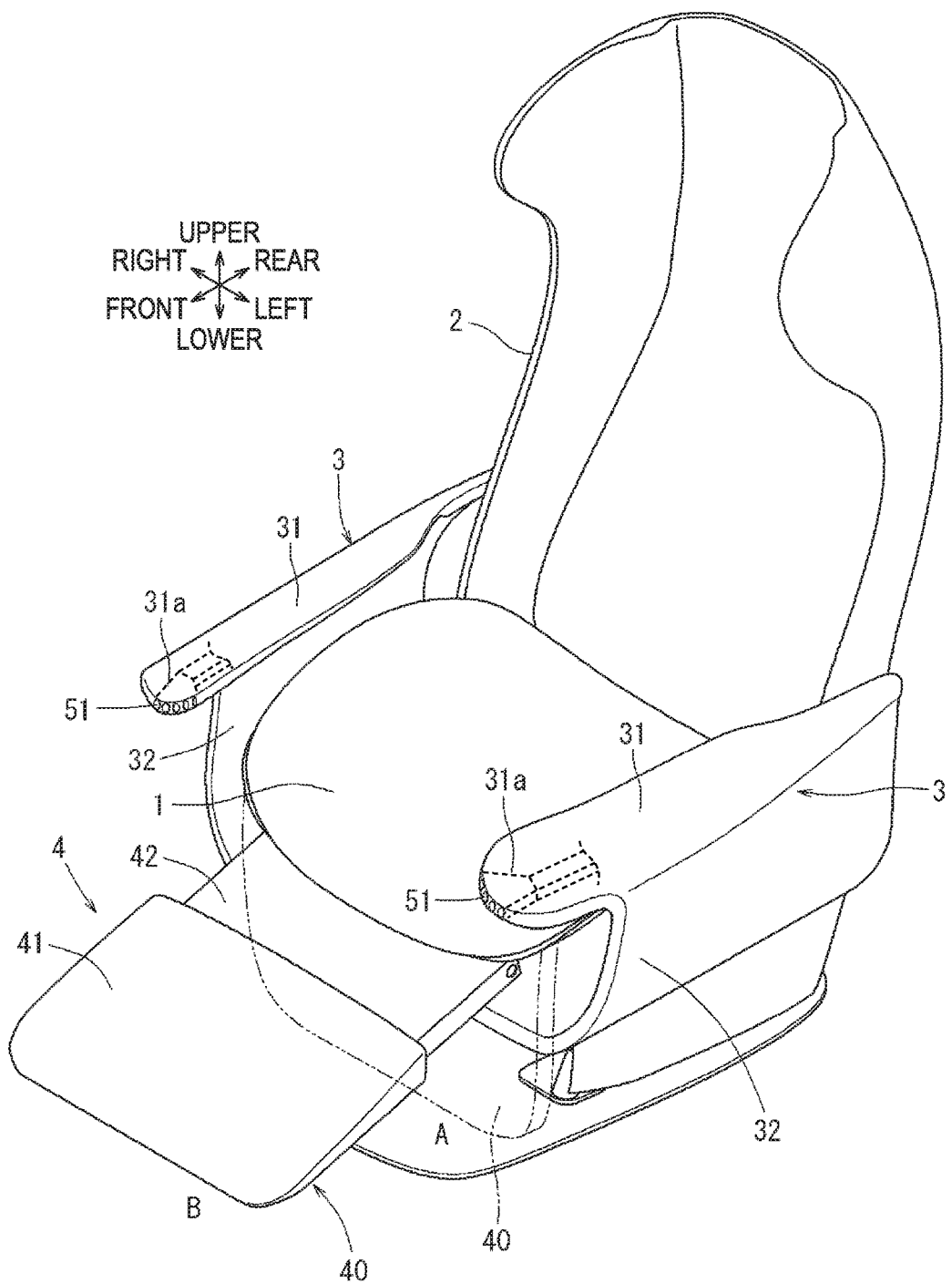
FIG. 1 is a perspective view of an automobile seat to which a first embodiment of the disclosure is applied.
Figure 2:
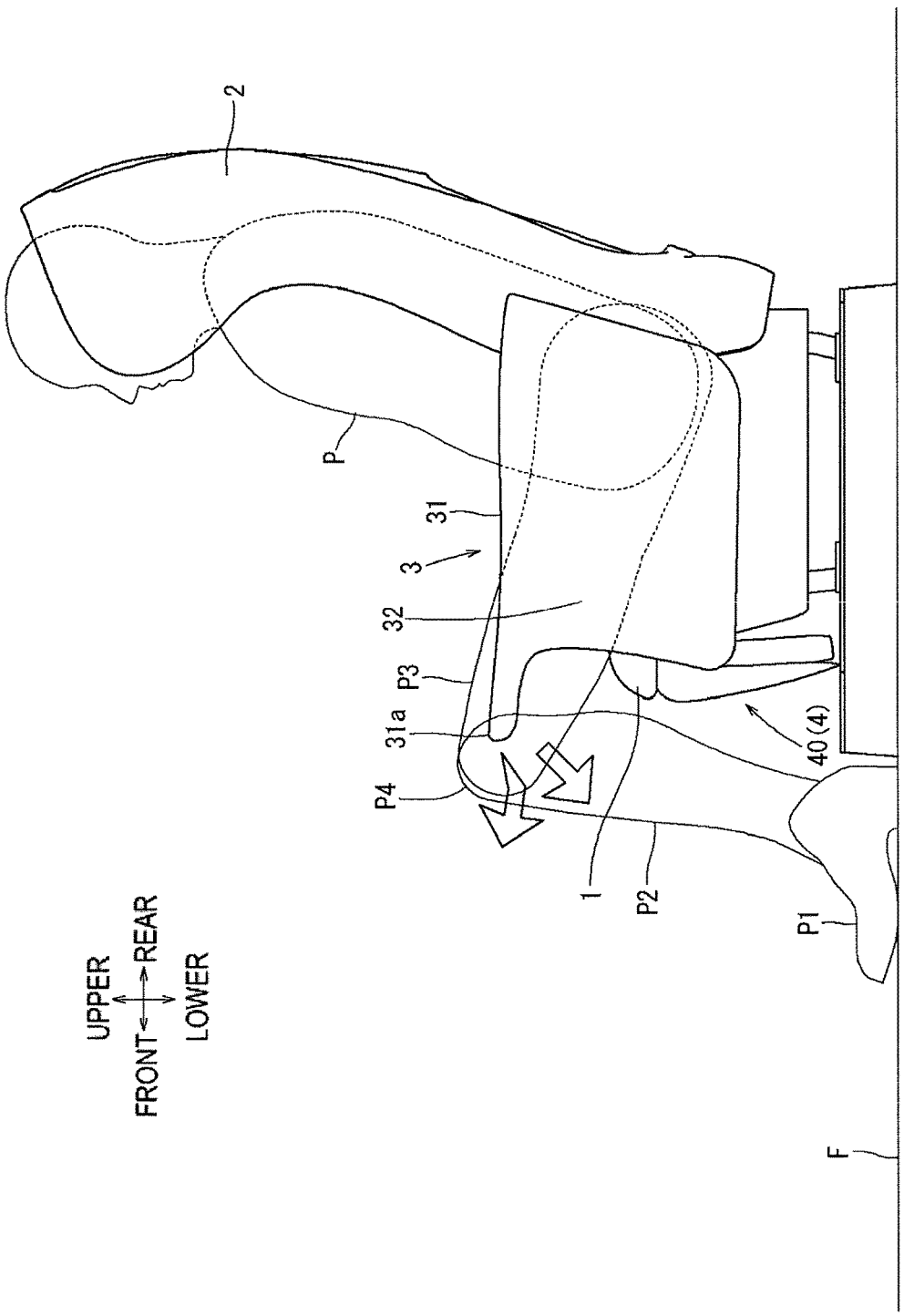
FIG. 2 is an explanatory lateral view for illustrating a use state of the first embodiment.

FIGS. 1 and 2 show a first embodiment of the disclosure. The first embodiment shows an example in which the disclosure is applied to an automobile seat (hereinafter simply referred to as a seat which corresponds to the seat of the disclosure). In each figure, directions of each portion in a state where the seat is mounted on an automobile are shown by arrows. In the following, description relating to directions is based on the above directions.

As shown in FIGS. 1 and 2, the seat includes a seat cushion 1 serving as a seating portion and a seat back 2 serving as a backrest. Armrests 3 separately forming an arm support are provided on both left and right sides of the seat cushion 1, and an ottoman apparatus 4 which lifts and supports lower leg portions P2 of a seated person P from a lower side is provided at a front side of the seat cushion 1.

The armrests 3 include top plate portions 31 which directly support arms of the seated person P, and vertical wall portions 32 which cover a lateral side of the seat cushion 1 and support the top plate portions 31 from a lower side. The top plate portions 31 and the vertical wall portions 32 are integrally formed. Further, front end portions 31a of the top plate portions 31 are formed to protrude to be positioned on a front side than a front end of the seat cushion 1.

The ottoman apparatus 4 includes a lower leg portion support 40 which lifts and supports the lower leg portions P2 of the seated person P from a back side thereof, and the lower leg portion support 40 is configured to be rotatable between a storage position A in which the lower leg portion support 40 is stored at a lower side of the seat cushion 1 and a deployed position B in which the lower leg portion support 40 is deployed towards a front side of the seat cushion 1. The lower leg portion support 40 in the deployed position B can lift the lower leg portions P2 of the seated person P from the back side and allow the seated person P to take a comfortable posture. When in the storage position A, the lower leg portion support 40 is provided at a rear side of the lower leg portions P2 of the seated person P who sits with feet P1 thereof placed on a floor F on which the seat is installed. In FIG. 2, P3 represents upper legs of the seated person P, and P4 represents knees thereof.

The lower leg portion support 40 is configured to be expandable and retractable freely in a longitudinal direction of the lower leg portions P2 of the seated person P, and includes a support main body 41 configuring the lower leg portion support 40 in a state where length of the lower leg portion support 40 is shortened; and an extension body 42 which projects from the support main body 41 in the length direction and configures the lower leg portion support 40 together with the support main body 41 in a state where the lower leg portion support 40 is expanded. A reason why the lower leg portion support 40 is configured to be expandable and retractable freely is that the ottoman apparatus 4 is compactly stored in the storage position A, and is capable of supporting a front end of the lower leg portions P2 of the seated person P in the deployed position B so as to suppress a local increase of supporting pressure.

Although not shown in the figures, an air conditioning apparatus for blowing temperature-adjusted air of which a temperature is adjusted is provided on a lower side of the seat cushion 1. Meanwhile, air outlets 51, through which the temperature-adjusted air is blown out towards knees P4 and the lower leg portions P2 of the legs of the seated person P, are provided on front end surfaces of the front end portions 31a of the armrests 3. Air ducts (not shown) are provided inside the top plate portions 31 so as to guide the temperature-adjusted air of the air conditioning apparatus to the air outlets 51. The air ducts inside the top plate portions 31 and the air conditioning apparatus are connected by air ducts (not shown) disposed inside the vertical wall portions 32. The front end portions 31a of the armrest 3 correspond to the lateral member of the disclosure.

When the temperature-adjusted air from the air conditioning apparatus is blown out from the air outlets 51 via the air ducts, the temperature-adjusted air can be blown in a way of wrapping the legs including the knees P4 of the seated person P (see white arrows in FIG. 2). As a result, comfort of the legs of the seated person P can be improved. Moreover, in the first embodiment, since the front end portions 31a of the top plate portions 31 of the armrests 3 are disposed on the front side than the front end of the seat cushion 1 and the temperature-adjusted air is blown from the front end portions 31a, the temperature-controlled air can be effectively blown in a way of wrapping the knees P4 and the lower leg portions P2 of the legs of the seated person P which are positioned on the front side than the front end of the seat cushion 1.

Figure 3:
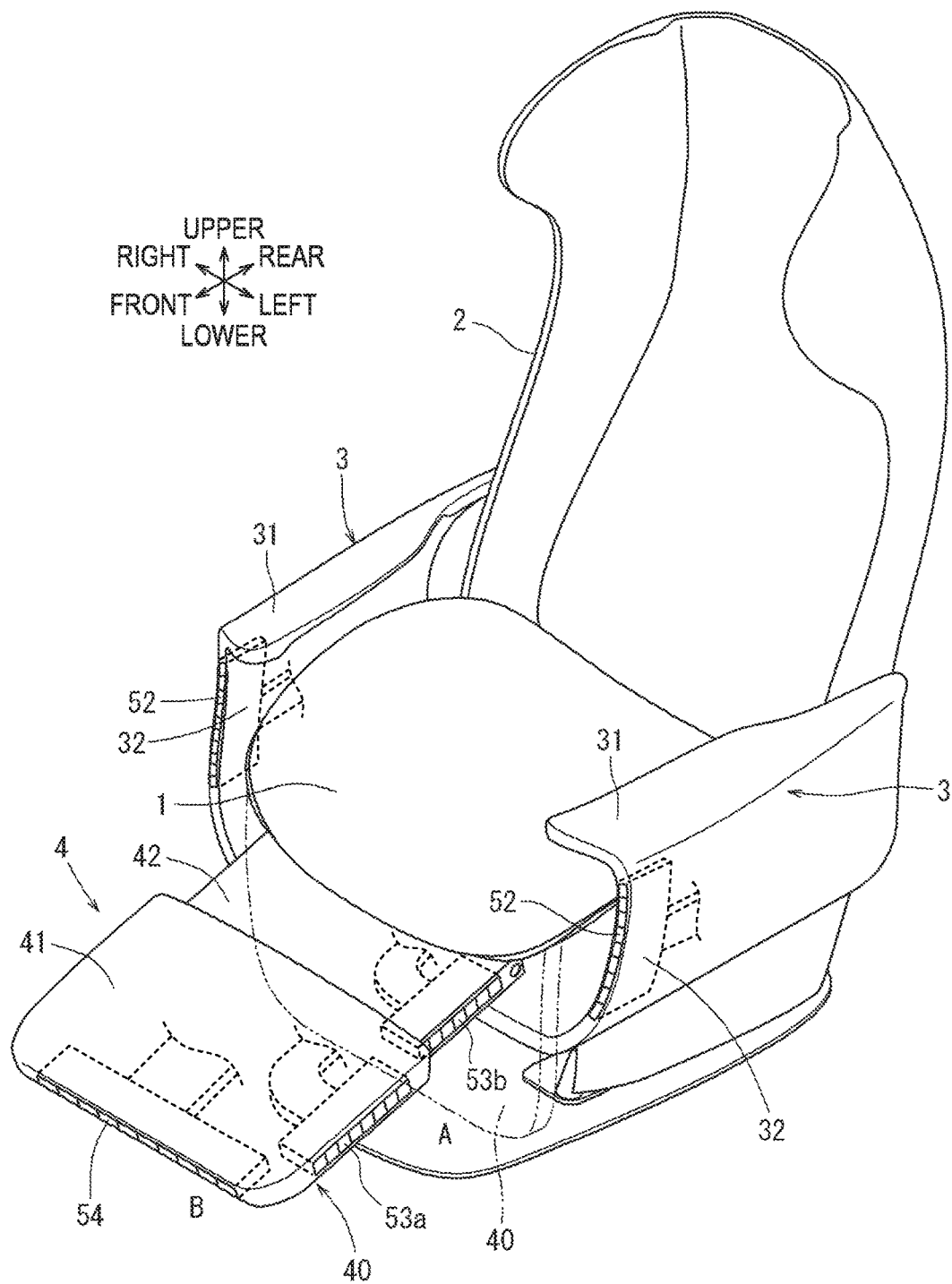
FIG. 3 is a perspective view of an automobile seat to which a second embodiment of the disclosure is applied.
Figure 4:
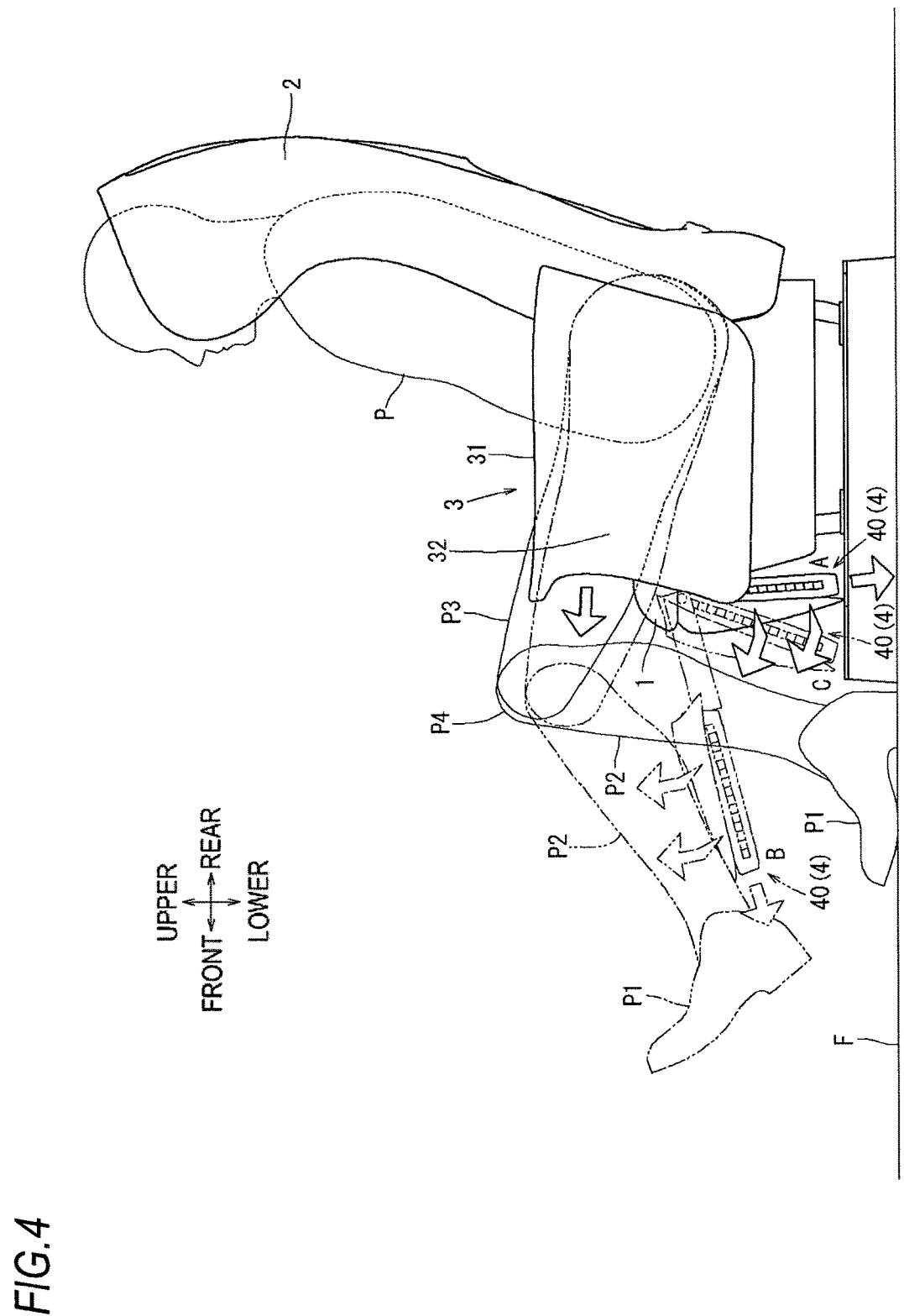
FIG. 4 is an explanatory lateral view for illustrating a use state of the second embodiment.

FIGS. 3 and 4 show a second embodiment of the disclosure. With respect to the first embodiment, the second embodiment is characterized in that temperature-adjusted air is blown out from vertical wall portions 32 of armrests 3 and a lower leg portion support 40 of an ottoman apparatus 4. Here, in the second embodiment, front end portions of top plate portions 31 of the armrests 3 are configured to be positioned on a rear side than a front end of a seat cushion 1. Other configurations in the second embodiment are the same as those in the first embodiment, and the same description will not be repeated.

Air outlets 52 are separately provided on front end surfaces of front end portions of the vertical wall portions 32 on the left and right. The temperature-adjusted air from the air conditioning apparatus is blown towards the lower leg portions P2 of the seated person P from an upper-lateral side through the air outlets 52. Further, air outlets 53a and 53b are respectively provided on both left and right lateral surfaces of the support main body 41 and the extension body 42 of the lower leg portion support 40. The temperature-adjusted air from the air conditioning apparatus is blown towards the lower leg portions P2 of the seated person P from a lateral side through the air outlets 53a and 53b. Further, an air outlet 54 is provided on a front end surface of a front end portion of the support main body 41. The temperature-adjusted air from the air conditioning apparatus is blown towards the feet P1 of the legs of the seated person P.

Although not shown in the figures, air ducts (not shown) are provided inside the vertical wall portions 32 so as to guide the temperature-adjusted air of the air conditioning apparatus to each of the air outlets 52. The air ducts inside the vertical wall portions 32 are connected to the air conditioning apparatus (not shown) by other air ducts (not shown) disposed at an inner side of the vertical wall portions 32. Further, in order to guide air to the air outlets 53a, 53b, and 54 of the support main body 41 and the extension body 42 of the lower leg portion support 40, air ducts (not shown) are provided inside the lower leg portion support 40 and the seat cushion 1. The air ducts of the lower leg portion support 40 and the seat cushion 1 are connected to flexible ducts (not shown), so that a relative movement between the lower leg portion support 40 and the seat cushion 1 is allowed. Further, the air ducts inside the seat cushion 1 are connected to the air conditioning apparatus (not shown) by the other air ducts (not shown) disposed at an inner side of the vertical wall portions 32. The vertical wall portions 32 of the armrest 3 correspond to the lateral member of the disclosure.

Figure 5:
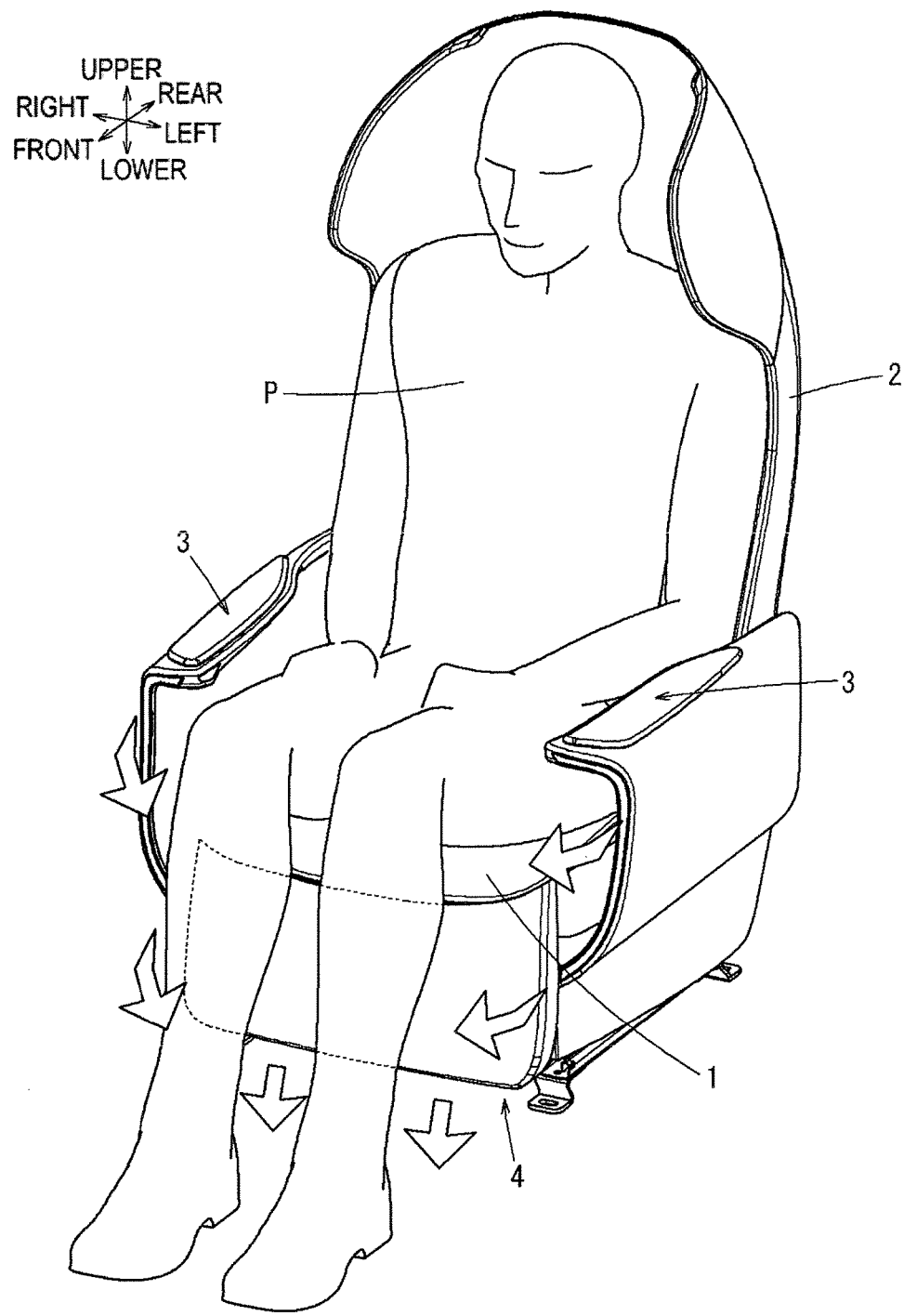
FIG. 5 is an explanatory perspective view for illustrating operation of the second embodiment and shows a state where an ottoman is in a storage position.
Figure 6:
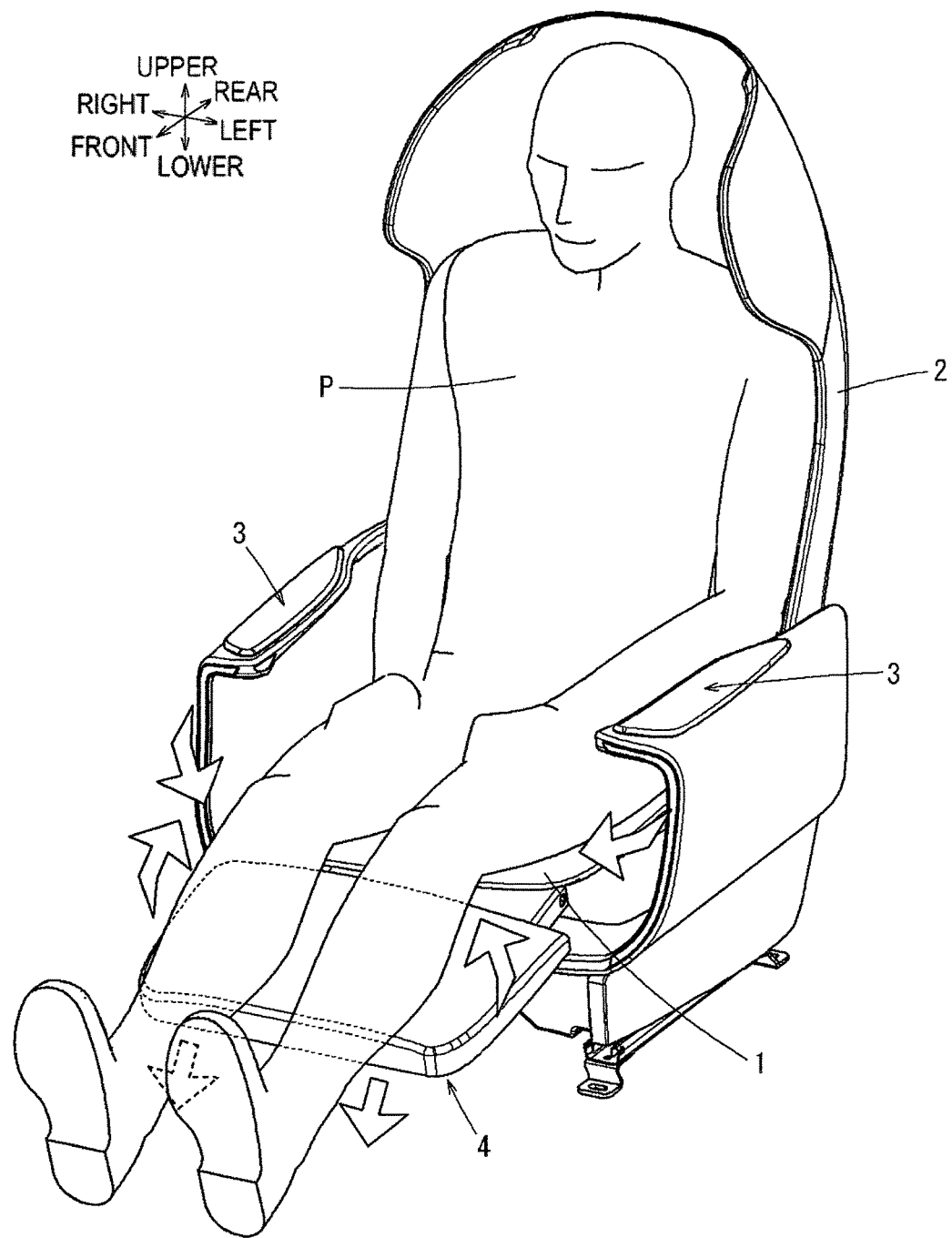
FIG. 6 is an explanatory perspective view for illustrating the operation of the second embodiment and shows a state where the ottoman is in a deployed position.

As shown by white arrows in FIGS. 4 to 6, when the temperature-adjusted air is blown out from each of the air outlets 52, 53a, 53b, and 54, the temperature-adjusted air is blown in a way of wrapping the legs of the seated person P, so that comfort of the legs of the seated person can be improved. In a case of the second embodiment, since temperature-adjusted air is also blown out from each of the air outlets 53a, 53b, 54 of the lower leg portion support 40 in addition to the air outlets 52 of the vertical wall portions 32, the temperature-adjusted air can be blown in a way of more effectively wrapping the entire legs of the seated person P by blowing air from a position close to the lower leg portions P2. Further, as shown in FIG. 6, even in a state where the ottoman apparatus 4 is in a deployed position B, the temperature-adjusted air can be blown from a position close to the lower leg portions P2 of the seated person P.

Here, compared with a state where the ottoman apparatus 4 is set in the deployed position B as shown by virtual lines in FIG. 4 and as shown in FIG. 6, the lower leg portion support 40 is separated from the lower leg portions P2 in a state where the ottoman apparatus 4 is set in a storage position A as shown by solid lines in FIG. 4 and as shown in FIG. 5. Accordingly, when the air conditioning apparatus is operated with the ottoman apparatus 4 set in the storage position A, it is preferable to configure the lower leg support portion 40 to move from the storage position A as indicated by C in FIG. 4.

In the second embodiment, air may also be blown from the front end portions of the top plate portions 31 of the armrests 3 towards the lower leg portions P2 of the seated person P. Further, in the second embodiment, the air may be blown from either of a lateral and a front end portion of the lower leg portion support 40.

Although specific embodiments have been described above, the disclosure is not limited to appearances and configurations thereof, and various changes, addition and deletion can be made without changing the spirit of the disclosure. For example, although the disclosure is applied to a seat of an automobile in the above embodiments, the disclosure may be applied to a vehicle seat mounted on an airplane, a ship, a train, and the like, or applied to an easy chair, a movie theater seat, and the like. Further, in the above embodiments, the temperature-adjusted air is blown out from the armrests and the ottoman, but the air may be blown out from a shield provided on lateral portions of the seat cushion.

The disclosure provides illustrative, non-limiting examples as follows:

According to a first aspect, there is provided an air conditioning seat configured to blow temperature-adjusted air whose temperature is adjusted by an air conditioning apparatus towards a seated person, the air conditioning seat including: a seat including: a seat cushion serving as a seating portion; and a seat back serving as a backrest; a lateral member which is provided along the seated person seated on the seat on a lateral side of the seated person; a first air duct which is provided in the lateral member and is configured to guide the temperature-adjusted air towards the seated person; and a first air outlet from which the temperature-adjusted air is configured to be blown out from first the air duct, wherein the temperature-adjusted air is configured to be directed and blown out towards at least one of a knee and a lower leg portion of a leg of the seated person through the first air outlet, the at least one of the knee and the lower leg portion being positioned on a front side than a front end of the seat cushion.

In the first aspect, the lateral member can be configured by an armrest which supports an arm of the seated person, a vertical wall member which covers a lateral side of the seated person on a lower side of the armrest, a shield which is a decorative cover for covering a lateral portion of the seat cushion, and the like.

According to the first aspect, since the temperature-adjusted air is directed and blown from the lateral member towards the at least one of the knee and the lower leg portion of the leg of the seated person which are positioned on the front side than the front end of the seat cushion, the temperature-adjusted air can be blown in a way of wrapping the leg of the seated person. As a result, comfort of the leg of the seated person can be improved.

According to a second aspect, there is provided the air conditioning seat according to the first aspect, wherein the lateral member is an armrest for supporting an arm of the seated person, wherein the armrest includes a top plate portion which directly supports the arm of the seated person and a vertical wall portion which covers a lateral side of the seat cushion and supports the top plate portion from a lower side, and wherein the first air outlet is provided in a front end portion of at least one of the top plate portion and the vertical wall portion.

In the second aspect, the first air outlet can be provided on a front surface or a lateral surface of the front end portion of the at least one of the top plate portion and the vertical wall portion, or provided on a lower surface of the front end portion of the top plate.

According to the second aspect, since the temperature-adjusted air is blown from the top plate portion of the armrest which is disposed higher than the knee of the seated person, and the vertical wall portion which is disposed lower than the top plate and covers the lateral side of the seated person, the temperature-adjusted air can be blown in a way of wrapping the entire leg of the seated person.

According to a third aspect, there is provided the air conditioning seat according to the second aspect, wherein the first air outlet is provided on a front end surface of the front end portion of the at least one of the top plate portion and the vertical wall portion.

According to the third aspect, the temperature-adjusted air can be blown from a position close to the lower leg portion in a way of effectively wrapping the entire leg of the seated person.

According to a fourth aspect, there is provided the air conditioning seat according to the second aspect, wherein a front end portion of the armrest and the first air outlet are positioned on a front side than the front end of the seat cushion.

According to the fourth aspect, since the front end portion of the armrest is disposed on the front side than the front end of the seat cushion and the temperature-adjusted air is blown from the front end portion of the armrest, the temperature-adjusted air can be blown effectively in a way of wrapping the at least one of the knee and the lower leg portion of the leg of the seated person which is positioned on the front side than the front end of the seat cushion.

According to a fifth aspect, there is provided the air conditioning seat according to any one of the first to fourth aspects, further including: an ottoman which supports a back side of the lower leg portion of the seated person by a lower leg portion support at a front side of the seat cushion, wherein a second air duct configured to blow air towards at least one of a feet and the lower leg portion of the leg of the seated person is provided in the lower leg portion support.

According to the fifth aspect, since the temperature-adjusted air is blown from the lower leg portion support of the ottoman, even if the ottoman is set in a deployed position and in a state of lifting the legs of the seated person in a front-upper side, the temperature-adjusted air can be blown in a way of wrapping the entire leg of the seated person by the temperature-adjusted air from both the lateral member and the lower leg portion support.

According to a sixth aspect, there is provided the air conditioning seat according to the fifth aspect, wherein a second air outlet from which the temperature-adjusted air is configured to be blown out from the second air duct is provided on a lateral side of the lower leg portion support, and wherein the second air outlet is formed so as to generate an air flow which wraps the lower leg portion of the seated person.

According to the sixth aspect, since the temperature-adjusted air from the lower leg portion support of the ottoman is blown in a way of wrapping the lower leg portions of the seated person from the lateral side of the lower leg portion support, the temperature-adjusted air can be blown from a position close to the lower leg portions in a way of effectively wrapping the entire leg of the seated person.

According to a seventh aspect, there is provided the air conditioning seat according to the fifth aspect, wherein a second air outlet from which the temperature-adjusted air is configured to be blown out from the second air duct is provided in a front end portion of the lower leg portion support, and wherein the second air outlet is directed towards the foot of the leg of the seated person.

According to the seventh aspect, since the temperature-adjusted air from the lower leg portion support of the ottoman is blown from the front end portion of the lower leg portion support towards the foot of the seated person, the temperature-adjusted air can be blown in a way of effectively wrapping the entire leg of the seated person including the foot which is sensitive to the temperature adjusting effect.

What is claimed is:

1. An air conditioning seat configured to blow temperature-adjusted air whose temperature is adjusted by an air conditioning apparatus towards a seated person, the air conditioning seat comprising:
a seat including:
a seat cushion serving as a seating portion; and
a seat back serving as a backrest;
a lateral member which is provided along the seated person seated on the seat on a lateral side of the seated person;
a first air duct which is provided in the lateral member and is configured to guide the temperature-adjusted air towards the seated person; and
a first air outlet from which the temperature-adjusted air is configured to be blown out from first the air duct,
wherein the temperature-adjusted air is configured to be directed and blown out towards at least one of a knee and a lower leg portion of a leg of the seated person through the first air outlet, the at least one of the knee and the lower leg portion being positioned on a front side of the seat cushion,
wherein the lateral member is an armrest for supporting an arm of the seated person,
wherein the armrest includes a top plate portion which directly supports the arm of the seated person and a vertical wall portion which covers a lateral side of the seat cushion and supports the top plate portion from a lower side, and
wherein the first air outlet is provided on a front surface of a front end portion of the top plate portion,
wherein the front end portion of the top plate portion is positioned on a front side of the seat so as to protrude farther than a front end of the seat cushion in a forward facing direction.

2. The air conditioning seat according to claim 1, further comprising:
an ottoman which supports a back side of the lower leg portion of the seated person by a lower leg portion support at the front side of the seat cushion,
wherein a second air duct configured to blow air towards at least one of a feet and the lower leg portion of the leg of the seated person is provided in the lower leg portion support.

3. The air conditioning seat according to claim 2,
wherein a second air outlet from which the temperature-adjusted air is configured to be blown out from the second air duct is provided on a lateral side of the lower leg portion support, and
wherein the second air outlet is formed so as to generate an air flow which wraps the lower leg portion of the seated person.

4. The air conditioning seat according to claim 2,
wherein a second air outlet from which the temperature-adjusted air is configured to be blown out from the second air duct is provided in a front end portion of the lower leg portion support, and
wherein the second air outlet is directed towards the foot of the leg of the seated person.

5. An air conditioning seat configured to blow temperature-adjusted air whose temperature is adjusted by an air conditioning apparatus towards a seated person, the air conditioning seat comprising:
a seat including:
a seat cushion serving as a seating portion; and
a seat back serving as a backrest;
a lateral member which is provided along the seated person seated on the seat on a lateral side of the seated person;
a first air duct which is provided in the lateral member and is configured to guide the temperature-adjusted air towards the seated person; and
a first air outlet from which the temperature-adjusted air is configured to be blown out from first the air duct,
wherein the temperature-adjusted air is configured to be directed and blown out towards at least one of a knee and a lower leg portion of a leg of the seated person through the first air outlet, the at least one of the knee and the lower leg portion being positioned on a front side of the seat cushion,
wherein the lateral member is an armrest for supporting an arm of the seated person,
wherein the armrest includes a top plate portion which directly supports the arm of the seated person and a vertical wall portion which covers a lateral side of the seat cushion and supports the top plate portion from a lower side, and
wherein, in the vertical wall portion, the first air outlet is provided only on a front surface of the vertical wall portion.

* * * * *